United States Patent [19]
Preston et al.

[11] Patent Number: 5,489,844
[45] Date of Patent: Feb. 6, 1996

[54] NOISE-CANCELLING QUADRATURE MAGNETIC POSITION, SPEED AND DIRECTION SENSOR

[75] Inventors: Mark A. Preston, Niskayuna; Robert D. King, Schenectady, both of N.Y.

[73] Assignee: General Electric Company, Schenectady, N.Y.

[21] Appl. No.: 61,931

[22] Filed: May 17, 1993

[51] Int. Cl.⁶ .......................... G01B 7/14; G01R 33/025; H01L 43/06
[52] U.S. Cl. .................... 324/207.12; 324/207.2
[58] Field of Search .......... 324/207.12, 207.2, 324/207.25, 207.24, 225, 326, 174, 165

[56] References Cited

U.S. PATENT DOCUMENTS 4,639,674  1/1987  Rippingale .................. 324/326
5,241,267  8/1993  Gleixner et al. ............ 324/174

*Primary Examiner*—Walter E. Snow
*Attorney, Agent, or Firm*—Jill M. Breedlove; Marvin Snyder

[57] ABSTRACT

An array of three magnetic sensors in a single package is employed with a single bias magnet for sensing shaft position, speed and direction of a motor in a high magnetic noise environment. Two of the three magnetic sensors are situated in an anti-phase relationship (i.e., 180° out-of-phase) with respect to the relationship between the other of the two sensors and magnetically salient target, and the third magnetic sensor is situated between the anti-phase sensors. The result is quadrature sensing with noise immunity for accurate relative position, speed and direction measurements.

5 Claims, 2 Drawing Sheets

NOISE-CANCELLING QUADRATURE MAGNETIC POSITION, SPEED AND DIRECTION SENSOR

This invention was made with Government support under contract DEAC07-90ID13019 awarded by DOE. The U.S. Government has certain rights in this invention.

FIELD OF THE INVENTION

The present invention relates generally to magnetic position sensors and, more particularly, to a low-cost method and apparatus for magnetically sensing shaft position, speed and direction of a motor in a high magnetic noise environment.

BACKGROUND OF THE INVENTION

Magnetic position sensors are attractive because of their simplicity and low cost. Such magnetic sensors use a bias magnet to establish a magnetic field. A magnetically salient target, typically a toothed wheel (e.g., a rotor), is passed near the bias magnet, modulating the bias field. A magnetic field sensor placed between the bias magnet and target detects this modulation. Relative position is then determined by counting the number of target saliencies (i.e., teeth) which pass the sensor. Speed is determined by calculating the frequency of target saliencies passing the sensor. In addition, the relative timing of two sensors in quadrature with the target saliency is used to determine shaft direction using known signal processing techniques.

Disadvantageously, for many applications, e.g., in electric motors, magnetic noise can be as much as an order of magnitude greater than the magnetic signal generated by a toothed wheel and sensor such as that described hereinabove, necessitating the use of more complex and costly sensing techniques. Furthermore, for applications wherein magnetic sensors are useful, but both direction and position must be sensed, two independent sensors in quadrature are required, resulting in a doubling of sensor cost. And, in many applications, quadrature sensing operation requires mechanical displacement of the two sensors such that the sensing teeth thereof are not adjacent, requiring accurate alignment of the sensing magnets and precise machining of the toothed wheel.

Accordingly, it is desirable to provide a simple and low-cost magnetic sensor which is useful for sensing shaft position, speed and direction in high magnetic noise environments.

SUMMARY OF THE INVENTION

An array of three magnetic sensors in a single package is employed with a single bias magnet for sensing shaft position, speed and direction of a rotor in a high magnetic noise environment. Two of the three magnetic sensors are situated in an anti-phase relationship (i.e., 180° out-of-phase) with respect to the relationship between the other of the two sensors and a magnetically salient target, and the third magnetic sensor is situated between the antiphase sensors. The output signal xn of each of the three sensors is represented as:

$$x_n = f_n(saliency) + NOISE$$

where n={1, 2, 3}; the function $f_n$ is dependent on the variation in target saliency; and NOISE represents the ambient magnetic noise for all three sensors. Quadrature position indications $x_{nc}$ are derived from the three sensor signals $x_n$ as:

$$x_{1c} = x_1 - x_2 = f_1(saliency) - f_2(saliency);$$

$$x_{2c} = x_3 - x_2 = f_3(saliency) - f_2(saliency);$$

such that the NOISE terms sum to zero, i.e., are cancelled.

The quadrature sensor output signals $x_{1c}$ and $x_{2c}$ are preferably digitized to enhance complete noise cancellation. Relative position is determined by counting the number of target saliencies which pass the sensor; speed is determined by calculating the frequency with which target saliencies pass the sensor; and shaft direction is determined by the relative timing of the two sensors in quadrature with the target saliency.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
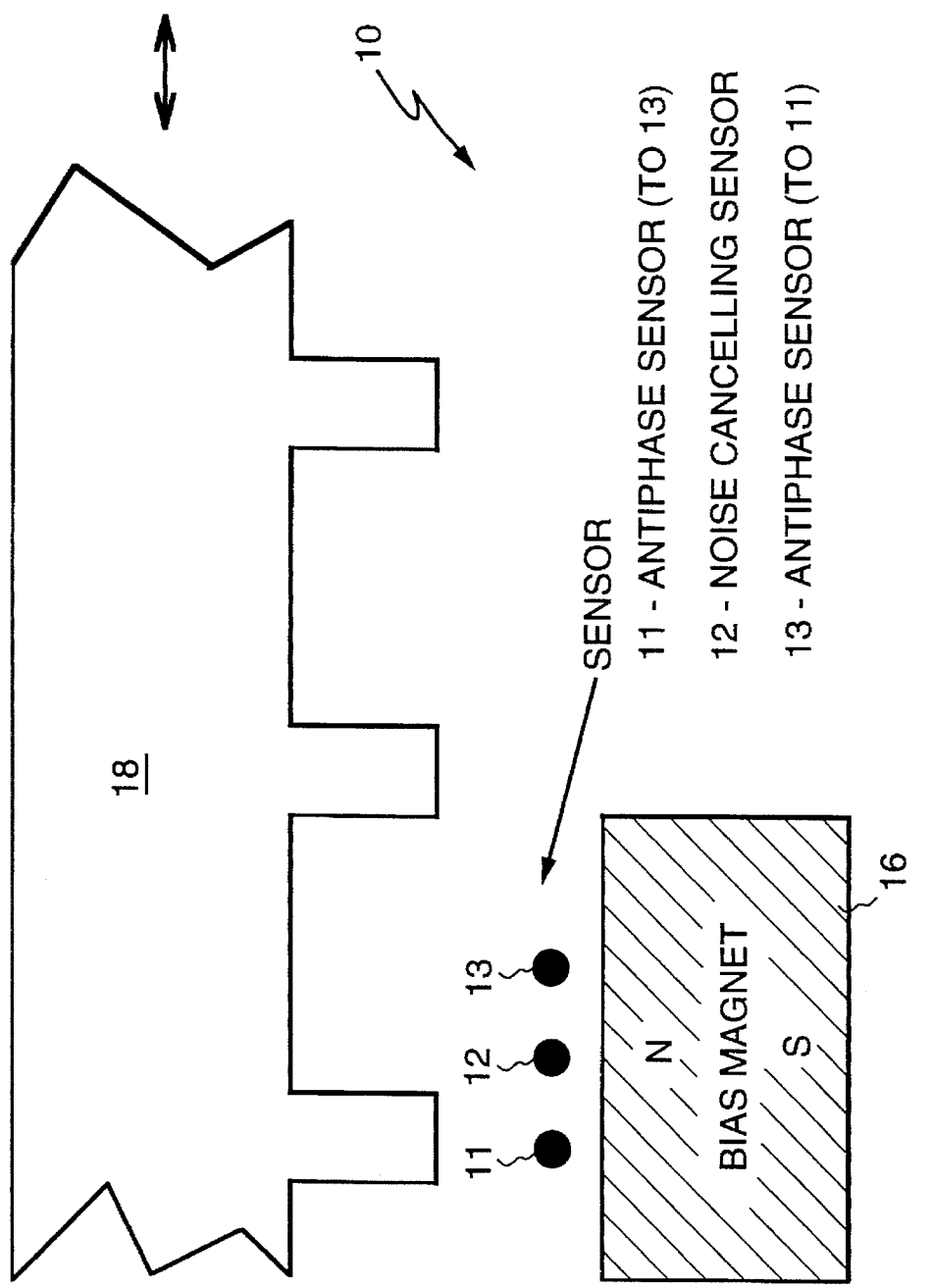
FIG. 1 schematically illustrates the noise-cancelling quadrature sensing scheme of the present invention.

FIG. 1 illustrates noise-cancelling magnetic sensing apparatus 10 for sensing shaft position, speed and direction of a motor in a high magnetic noise environment in accordance with the present invention. Magnetic sensing apparatus 10 includes an array of three magnetic sensors 11-13 and a single bias magnet 16. Exemplary magnetic sensors comprise well-known Hall effect sensors. Two of the three magnetic sensors (e.g., sensors 11 and 13) are situated in an anti-phase relationship (i.e., 180° out-of-phase) with respect to the relationship between the other of the two sensors and magnetically salient target 18 (e.g., a toothed wheel of a rotor), and the third magnetic sensor 12 is situated between the antiphase sensors 11 and 13. The output signal $x_n$ of each of the three sensors is represented as:

$$x_n = f_n(saliency) + NOISE$$

where n={1, 2, 3}; the function $f_n$ is dependent on the variation in target saliency; and NOISE represents ambient magnetic noise for all three sensors. Quadrature position indications $x_{nc}$ are derived from the three sensor output signals $x_n$ as:

$$x_{1c} = x_1 - x_2 = f_1(saliency) - f_2(saliency);$$

$$x_{2c} = x_3 - x_2 = f_3(saliency) - f_2(saliency);$$

such that the noise terms sum to zero, i.e., are cancelled.

For example, consider the case wherein $f_n = \sin(\alpha)$, such that $\alpha$ represents the saliency position, i.e., the position of a tooth of toothed wheel 18 relative to the sensor array. This yields sensor output signals:

$$x_1 = \sin(\alpha) + NOISE;$$

$$x_2 = \sin(\alpha + 90°) + NOISE;$$

$$x_3 = \sin(\alpha + 180°) + NOISE.$$

Figure 2A:
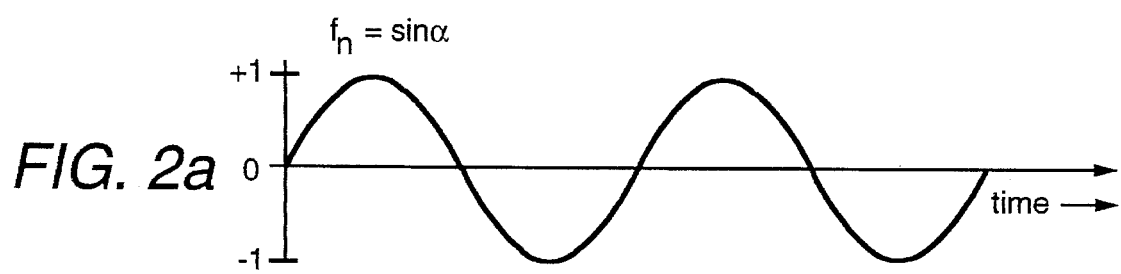
FIGS. 2a–2e graphically illustrate an exemplary application of the noise-cancelling quadrature sensing scheme of the present invention.
Figure 2B:
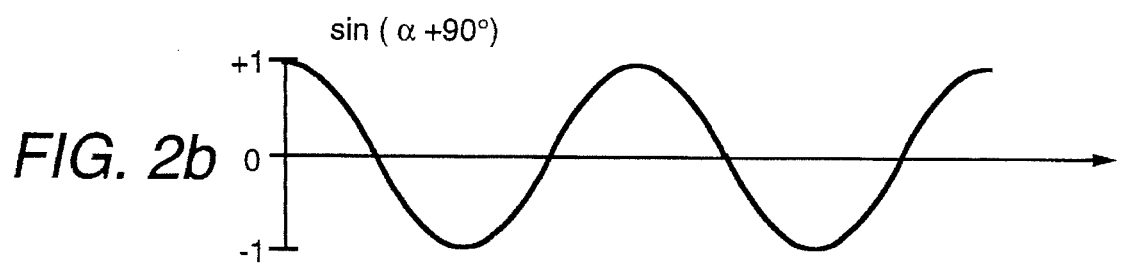
Figure 2C:
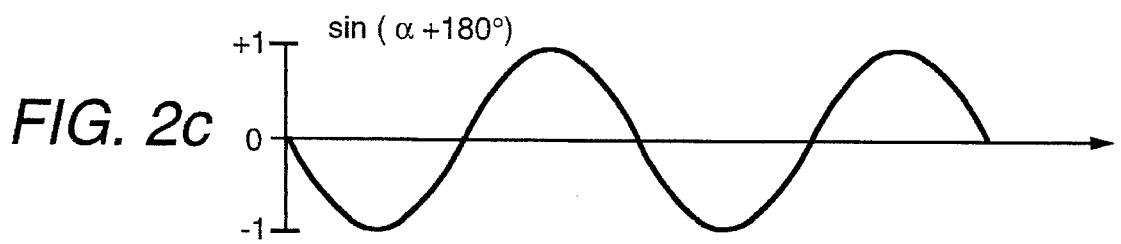

The sensor signals $x_1$, $x_2$ and $x_3$ are graphically illustrated in FIGS. 2a–2c. In accordance with the present invention, the quadrature sensor output signals $x_{1c}$ and $x_{2c}$ are derived from the signals $x_1$, $x_2$ and $x_3$ as follows:

$$x_{1c} = x_1 - x_2 = \sqrt{2} \cos(\alpha + 45°);$$

$$x_{2c} = x_3 - x_2 = \sqrt{2} \cos(\alpha + 135°);$$

such that $x_{nc}$ (where n=1, 2) are in quadrature.

Figure 2D:
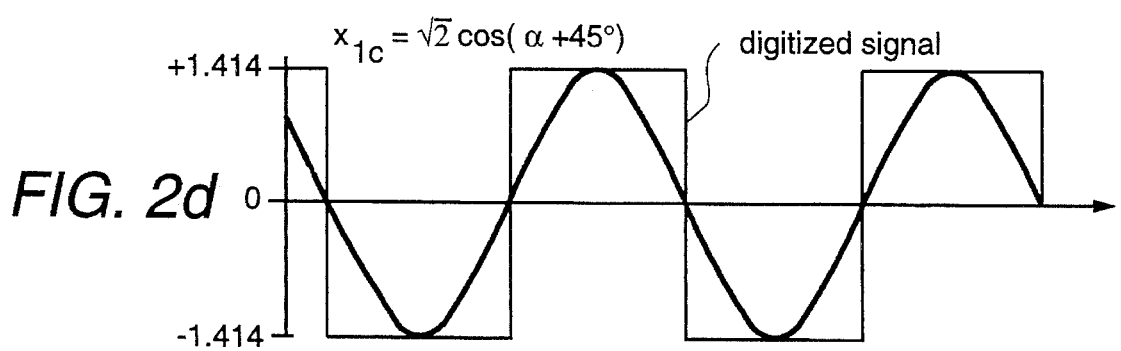
Figure 2E:
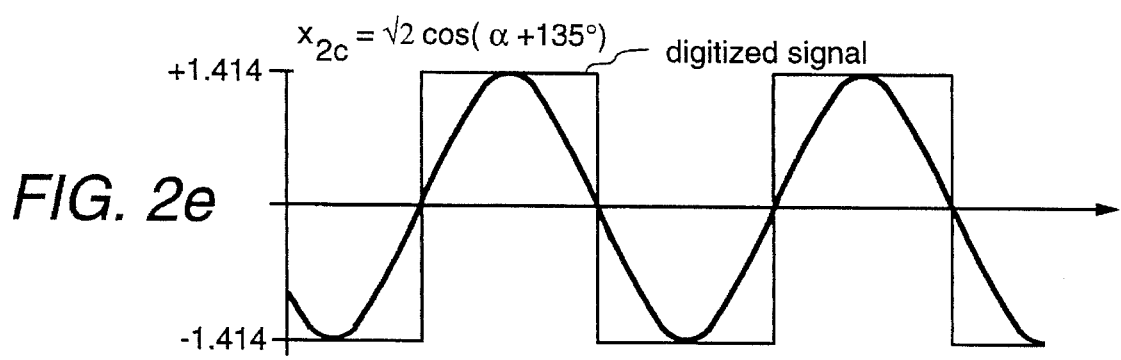

The quadrature sensor output signals $x_{1c}$ and $x_{2c}$ are preferably digitized by detecting zero-crossings, as illustrated in FIGS. 2d and 2e. Hence, relative position is determined by counting the number of target saliencies which pass the sensor; speed is determined by calculating the frequency with which target saliencies pass the sensor; and shaft direction is determined by the relative timing of the two sensor signals $x_{1c}$ and $x_{2c}$.

In some applications, the NOISE function may be slightly dependent on the saliency position, resulting in incomplete noise cancellation. However, with sensor output signals $x_{1c}$ and $x_{2c}$ being digitized by detecting zero-crossings, the zero-crossings occur at points of geometrical symmetry where the noise signals are fully cancelled. Hence, any noise sensitivity to saliency position sums to zero at the zero-crossing points and thus has no effect on the digitized signal.

Advantageously, a noise-cancelling quadrature sensor according to the present invention can be implemented in a single package for use at a single location; hence, alignment of two sensors as in conventional schemes is not a problem. Furthermore, such a sensor is operable at very low speeds, i.e., approaching zero speed, since the sensed signals depend on the magnitude of a dc field rather than the magnitude of a voltage as in conventional sensors.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A magnetic quadrature sensor, comprising:
    an array of three magnetic sensors situated between a magnetically salient target and a bias magnet for establishing a magnetic field, two of said three magnetic sensors being situated in an anti-phase relationship with respect to said salient target, the third of said three magnetic sensors being situated between the two anti-phase magnetic sensors, the output signals $x_n$ of said three magnetic sensors being represented as:

$$x_n = f_n(saliency) + NOISE;$$

where n={1, 2, 3}, function $f_n$ is dependent on variation in the target saliency, and NOISE represents ambient magnetic noise; quadrature output signals $x_{nc}$ being derived from the three sensor signals $x_n$ as:

$$x_{1c} = x_1 - x_2 = f_1(saliency) - f_2(saliency);$$

$$x_{2c} = x_3 - x_2 = f_3(saliency) - f_2(saliency),$$

whereby the NOISE terms are cancelled to provide quadrature relative position indications for said magnetically salient target that are substantially immune to ambient magnetic noise.

2. The magnetic quadrature sensor of claim 1 wherein the function $f_n = \sin(\alpha)$, such that the output signals $x_n$ of said three magnetic sensors are represented as:

$$x_1 = \sin(\alpha) + NOISE;$$

$$x_2 = \sin(\alpha + 90°) + NOISE;$$

$$x_3 = \sin(\alpha + 180°) + NOISE;$$

yielding quadrature output signals:

$$x_{1c} = x_1 - x_2 = \sqrt{2} \cos(\alpha + 45°);$$

$$x_{2c} = x_3 - x_2 = \sqrt{2} \cos(\alpha + 135°).$$

3. The magnetic quadrature sensor of claim 1 wherein said array of three magnetic sensors is packaged within a single package.

4. The magnetic quadrature sensor of claim 1 wherein said quadrature output signals $x_{nc}$ comprise digital signals.

5. The magnetic quadrature sensor of claim 1 wherein each of said three magnetic sensors comprises a Hall-effect sensor.

* * * * *